(12) United States Patent
Ushijima (10) Patent No.: US 9,920,967 B2
(45) Date of Patent: Mar. 20, 2018

(54) HOT AND COLD WATER AIR CONDITIONING SYSTEM

(71) Applicant: Mitsubishi Electric Corporation, Tokyo (JP)

(72) Inventor: Takahiro Ushijima, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 691 days.

(21) Appl. No.: 14/516,617

(22) Filed: Oct. 17, 2014

(65) Prior Publication Data

US 2015/0135750 A1     May 21, 2015

(30) Foreign Application Priority Data

Nov. 19, 2013   (JP) .................................. 2013-239147

(51) Int. Cl.
     *F25B 49/02*      (2006.01)
     *F24H 4/02*      (2006.01)
     (Continued)

(52) U.S. Cl.
     CPC ................ *F25B 49/02* (2013.01); *F24D 3/18* (2013.01); *F24D 19/1039* (2013.01);
     (Continued)

(58) Field of Classification Search
     CPC .......... F25B 49/02; F25B 40/00; F25B 13/00; F25B 29/003; F25B 2313/004;
     (Continued)

(56) References Cited

U.S. PATENT DOCUMENTS 4,071,745 A  *   1/1978   Hall ..................... G05B 19/075
                                                            165/11.1
4,228,511 A  *  10/1980   Simcoe ............. G05D 23/1905
                                                            165/257

(Continued)

FOREIGN PATENT DOCUMENTS

EP         2 610 558 A2     7/2013
EP         2 620 711 A2     7/2013
(Continued)

OTHER PUBLICATIONS

JP,2005-147410,A English Translation.*
(Continued)

*Primary Examiner* — David Teitelbaum
*Assistant Examiner* — Nelson Nieves
(74) *Attorney, Agent, or Firm* — Posz Law Group, PLC (57) ABSTRACT

The hot and cold water air conditioning system includes a water temperature sensor configured to detect a temperature of water flowing out of the heat pump heat source apparatus by an operation of the water circulation pump, and a controller configured to perform, in a heating operation, on/off normal control that turns on a compressor when the water temperature detected by the water temperature sensor becomes lower than a target water temperature and turns off the compressor when the water temperature becomes higher than a first temperature value higher than the target water temperature, and to switch from the on/off normal control, upon repeating the on/off operation of the compressor at a minimum frequency necessary for an operation of the compressor in the on/off normal control, to on/off restriction control that turns on the compressor when the water temperature becomes lower than a second temperature value lower than the target water temperature and turns off the compressor when the water temperature becomes equal to or (Continued)

higher than a third temperature value higher than the target water temperature.

14 Claims, 4 Drawing Sheets

(51) Int. Cl.
    *F24H 9/20*     (2006.01)
    *F24D 3/18*     (2006.01)
    *F24D 19/10*     (2006.01)
    *F25B 29/00*     (2006.01)
    *F25B 13/00*     (2006.01)
    *F25B 40/00*     (2006.01)
    *F24F 5/00*     (2006.01)
    *F24F 11/00*     (2018.01)

(52) U.S. Cl.
    CPC ............ *F24F 5/0003* (2013.01); *F24H 4/02* (2013.01); *F24H 9/2007* (2013.01); *F25B 13/00* (2013.01); *F25B 29/003* (2013.01); *F25B 40/00* (2013.01); *F24D 2200/123* (2013.01); *F24F 2011/0045* (2013.01); *F25B 2313/003* (2013.01); *F25B 2313/004* (2013.01); *F25B 2339/047* (2013.01); *F25B 2600/00* (2013.01); *F25B 2600/021* (2013.01); *F25B 2600/0252* (2013.01); *Y02B 30/12* (2013.01); *Y02B 30/741* (2013.01)

(58) Field of Classification Search
    CPC .......... F25B 2313/003; F25B 2600/021; F25B 2600/0251; F24F 5/0003; F24F 2011/0045; F24D 19/1039; F24D 3/18; F24D 19/1069; F24H 4/02; F24H 9/2007; Y02B 30/741; Y02B 30/12
    See application file for complete search history.

(56) References Cited

U.S. PATENT DOCUMENTS

| | | | | | |
|---|---|---|---|---|---|
| 4,292,813 | A * | 10/1981 | Paddock | ................ | F25B 49/02 165/269 |
| 4,320,316 | A * | 3/1982 | Horii | ..................... | F25B 49/02 327/142 |
| 4,557,317 | A * | 12/1985 | Harmon, Jr. | ......... | F24F 11/0009 164/12 |
| 4,655,279 | A * | 4/1987 | Harmon, Jr. | ......... | F24F 11/0009 165/267 |
| 4,898,230 | A * | 2/1990 | Tsuchiyama | ......... | F24F 11/0009 165/265 |
| 5,129,233 | A * | 7/1992 | Takegawa | ............ | F24F 11/0009 62/160 |
| 5,560,422 | A * | 10/1996 | Matumoto | ........... | F24F 11/0009 165/253 |
| 5,722,248 | A * | 3/1998 | Suh | ....................... | F25D 17/062 62/180 |
| 6,336,337 | B1 * | 1/2002 | Yang | ...................... | F04B 49/06 62/160 |
| 6,478,084 | B1 * | 11/2002 | Kumar | ................. | F24F 11/0012 165/238 |
| 6,591,622 | B1 * | 7/2003 | Gherman | ............... | F25D 29/00 165/265 |
| 7,595,567 | B1 * | 9/2009 | Cannon | ................... | H02J 3/14 307/29 |
| 7,702,424 | B2 * | 4/2010 | Cannon | ................. | H04L 12/10 340/539.1 |
| 2005/0081548 | A1 * | 4/2005 | Lee | ........................ | F25D 21/12 62/277 |
| 2005/0235669 | A1 * | 10/2005 | Cho | ........................ | F25D 29/00 62/229 |
| 2007/0267508 | A1 * | 11/2007 | Hoglund | ................ | F24F 11/006 236/49.1 |
| 2008/0245085 | A1 * | 10/2008 | Jaffer | .................... | F25D 17/062 62/228.1 |
| 2009/0216382 | A1 * | 8/2009 | Ng | ....................... | F24F 11/0086 700/278 |
| 2009/0225479 | A1 * | 9/2009 | Jayanth | .................. | G01R 19/10 361/30 |
| 2010/0106302 | A1 * | 4/2010 | Thogersen | ........... | F25D 17/005 700/275 |
| 2010/0131106 | A1 * | 5/2010 | Kriangkanont | ........ | F25B 49/02 700/275 |
| 2010/0218527 | A1 * | 9/2010 | Kitagishi | ............... | F24F 11/008 62/228.5 |
| 2010/0293977 | A1 * | 11/2010 | Tanaka | .................... | F25D 11/00 62/186 |
| 2011/0120179 | A1 * | 5/2011 | Chin | ........................ | F24D 3/08 62/510 |
| 2011/0192176 | A1 * | 8/2011 | Kim | ....................... | F24F 3/065 62/115 |
| 2011/0203298 | A1 * | 8/2011 | Kim | ........................ | F24H 4/04 62/79 |
| 2011/0302949 | A1 * | 12/2011 | Honda | ...................... | F24D 3/08 62/324.6 |
| 2012/0006525 | A1 * | 1/2012 | Lafleur | .................. | F24F 11/006 165/238 |
| 2012/0053745 | A1 * | 3/2012 | Ng | ........................... | F24F 11/00 700/295 |
| 2012/0210737 | A1 * | 8/2012 | Giardino | ................ | F25D 29/00 62/115 |
| 2012/0216555 | A1 * | 8/2012 | Ishii | .................... | G05D 23/1902 62/126 |
| 2012/0260687 | A1 * | 10/2012 | Inaniwa | .................... | B04B 9/10 62/196.1 |
| 2012/0279237 | A1 * | 11/2012 | Ushijima | .................. | F24D 3/18 62/80 |
| 2012/0291468 | A1 * | 11/2012 | Kato | ........................ | F24F 3/06 62/185 |
| 2013/0014521 | A1 * | 1/2013 | Lukasse | ................. | F25D 21/04 62/80 |
| 2013/0025301 | A1 * | 1/2013 | Maitani | ............... | F24D 11/0214 62/79 |
| 2013/0025304 | A1 * | 1/2013 | Dorman | ................ | F25B 41/043 62/115 |

FOREIGN PATENT DOCUMENTS

| | | | |
|---|---|---|---|
| JP | | H05-223363 A | 8/1993 |
| JP | | H06-294542 A | 10/1994 |
| JP | | 2002-061925 A | 2/2002 |
| JP | | 2005-147410 A | 6/2005 |
| JP | | 2010-002069 A | 1/2010 |
| JP | | 2010-008036 A | 1/2010 |
| JP | | 2012-112583 A | 6/2012 |
| JP | | 2013-155911 A | 8/2013 |

OTHER PUBLICATIONS

Office Action dated Dec. 1, 2015 in the corresponding JP application No. 2013-239147 (with English translation).

Extended European Search Report dated Apr. 17, 2015 issued in corresponding EP patent application No. 14191927.4.

* cited by examiner

HOT AND COLD WATER AIR CONDITIONING SYSTEM

TECHNICAL FIELD

The present invention relates to a hot and cold water air conditioning system that supplies hot water or cold water generated by a heat pump heat source apparatus to a hot and cold water air-conditioning apparatus, to thereby heat or cool a room.

BACKGROUND ART

A heat pump hot water heating system for heating or supplying hot water utilizing a heat pump cycle includes a hot water circulation circuit for heating, in which hot water heated with a refrigerant of the heat pump cycle via a heat exchanger is supplied to an indoor radiator that heats the room or to a hot water tank, and then the hot water which has been used is returned to the heat exchanger of the heat pump cycle. To control the hot water to be supplied, the hot water circulation circuit for heating includes a supply temperature sensor that detects the supply temperature of the hot water to be supplied.

Conventional heat pump hot water heating systems generally employ the supply temperature control because of quick response and ease of controlling, to cope with fluctuation in heat pump capacity (compressor operation frequency) of the heat pump cycle. However, the heating system is operated with the minimum supply capacity through control of the compressor operation frequency on the heat source side of the heat pump cycle, for example when the efficiency of the indoor radiator on the load side of the hot water heating system is degraded, or when the required air-conditioning and hot water supply load is small such as in a transitional period between seasons. In such a case, when the heat amount supplied by the operation with the minimum supply capacity is larger than the heat transfer amount on the side of the air-conditioning and hot water supply load, the supply temperature of the hot water circulation circuit for heating exceeds the target supply temperature, and therefore the operation of the compressor is set to an on/off cycle operation owing to the quick response.

When the compressor enters the on/off cycle operation mode, not only the efficiency as a heat pump hot water heating system is degraded, but also the life span of the parts of the refrigerant circuit including the compressor and that of electric circuit parts may be shortened, owing to pressure fluctuation of the refrigerant circuit and repeated switching actions of relay contacts of the electric circuit, incurred by frequent on/off switching of the compressor.

An ideal measure for the mentioned drawback is reducing the operation frequency of the compressor so as make the heat amount based on the minimum supply capacity of the heat pump heat source apparatus equal to the heat transfer amount (in the case of hot water heating operation) or heat removal amount (in the case of cold water cooling operation) on the side of the air-conditioning and hot water supply load, regardless of how small the heat transfer amount or the heat removal amount is. However, a lower limit of the operation frequency is set in the compressor from the viewpoint of reliability thereof, and therefore the mentioned measure is still insufficient.

Accordingly, some of the conventional heat pump hot water heating systems are configured to lower the return temperature by reducing the rotation speed of the heating circulation pump to thereby reduce the flow speed of the circulating water when a decrease in heating load is detected, and then activate a mixing valve to open a bypass flow path so that a part of the discharged hot water joins the heating hot water, so as to lower the supply temperature (for example, see Patent Literature 1).

In addition, some heat pump hot water heating apparatuses are configured to gradually increase the rotation speed of the heating circulation pump after activating the heat pump until the heat pump cycle is stabilized, to control the rotation speed of the circulation pump so that the supply temperature reaches the target temperature, and then to control the rotation speed of the circulation pump so that the return temperature agrees with the target temperature (for example, see Patent Literature 2).

CITATION LIST

Patent Literature

[Patent Literature 1] Japanese Unexamined Patent Application Publication No. 2010-008036 (pages 7 to 12, FIGS. 1 to 10)
[Patent Literature 2] Japanese Unexamined Patent Application Publication No. 2012-112583 (pages 4 to 9, FIGS. 1 to 5)

SUMMARY OF INVENTION

Technical Problem

However, the foregoing arrangements are only applicable to hot water heating systems including a DC-driven water circulation pump which accepts the control of the rotation speed, and besides the cost of such systems increases because of complication of the control algorithm that enables the control of the water flow rate.

The present invention has been accomplished to solve the foregoing problem, and provides a hot and cold water air conditioning system that restricts, despite employing an inexpensive AC-driven water circulation pump operable with a relatively simple control algorithm though unable to control the rotation speed, a heat pump heat source apparatus from performing on/off cycle operation.

Solution to Problem

In an aspect, the present invention provides a hot and cold water air conditioning system that includes a heat pump heat source apparatus including a compressor driven according to an operation frequency, an air-conditioning apparatus configured to perform air conditioning in a room, pipes connecting the heat pump heat source apparatus and the air-conditioning apparatus in a ring shape thereby forming a circulation path, and a water circulation pump configured to circulate water inside the pipes. The hot and cold water air conditioning system also includes a water temperature sensor configured to detect a temperature of water flowing out of the heat pump heat source apparatus by an operation of the water circulation pump, and a controller configured to perform, in a heating operation, on/off normal control that turns on the compressor when the water temperature detected by the water temperature sensor becomes lower than a target water temperature and turns off the compressor when the water temperature becomes higher than a first temperature value higher than the target water temperature. The controller is configured to switch from the on/off normal control, upon repeating an on/off operation of the compressor at a minimum frequency necessary for an operation of the compressor in the on/off normal control, to on/off restriction control that turns on the compressor when the water temperature becomes lower than a second temperature value lower than the target water temperature and turning off the compressor when the water temperature becomes equal to or higher than a third temperature value higher than the target water temperature.

Advantageous Effects of Invention

In the hot and cold water air conditioning system configured as above, the controller transits to the on/off restriction control including turning on the compressor when the water temperature falls below a second temperature value lower than the target water temperature and turning off the compressor when the water temperature becomes equal to or higher than a third temperature value higher than the target water temperature, while repeating the turning on and off of the compressor at the minimum frequency necessary for operation of the compressor in the on/off normal control. The mentioned arrangement enables restriction of the on/off cycle operation even when the minimum supply capacity based on the operation frequency control of the compressor of the heat pump heat source apparatus is larger than the heat transfer amount (in the case of hot water heating operation) or heat removal amount (in the case of cold water cooling operation) of the air-conditioning apparatus, thereby allowing provision of the high-efficiency and long-life hot and cold water air conditioning system.

DESCRIPTION OF EMBODIMENTS

Embodiment 1

Figure 1:
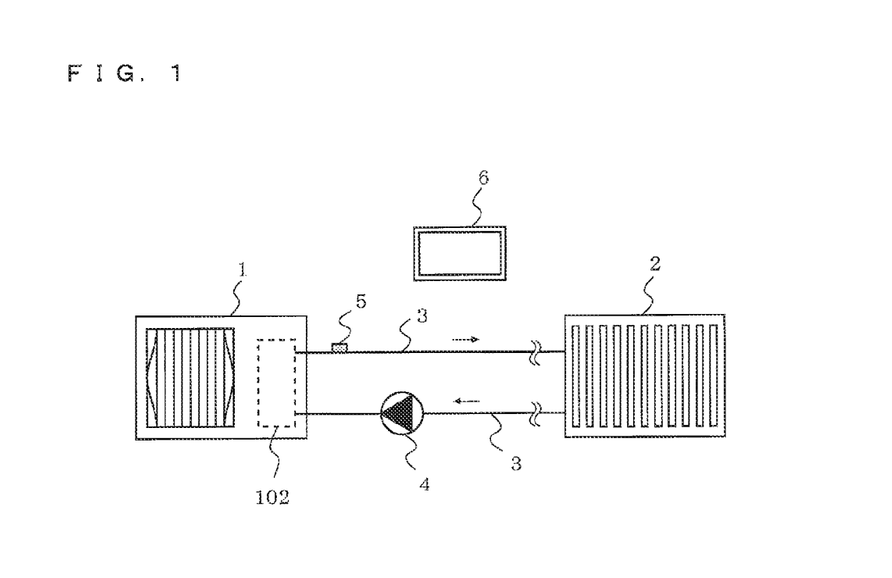
FIG. 1 is a block diagram showing a general configuration of a hot and cold water air conditioning system according to Embodiment 1.

FIG. 1 is a block diagram showing a general configuration of a hot and cold water air conditioning system according to Embodiment 1 of the present invention.

The hot and cold water air conditioning system shown in FIG. 1 includes a heat pump heat source apparatus 1 capable of performing either hot water heating or cold water cooling, a hot and cold water air-conditioning apparatus (air-conditioning apparatus) 2 for performing air conditioning in a room, a pipe 3 connecting the heat pump heat source apparatus 1 and the hot and cold water air-conditioning apparatus 2 in a ring shape thereby forming a circulation path, a water circulation pump 4 that circulates water in the circulation path, a water temperature sensor 5 that detects a temperature of hot water or cold water (hereinafter, water temperature) flowing out of the heat pump heat source apparatus 1 by an operation of the water circulation pump a, and a controller 6.

The hot and cold water air-conditioning apparatus 2 heats or cools the space in the room depending on whether hot water or cold water is supplied from the heat pump heat source apparatus 1 through the pipe 3. The water circulation pump 4 is caused to rotate at a constant rotation speed when AC power is applied under control of the controller 6. The water circulation pump 4 eliminates the need to control the rotation speed thereof, and therefore a simplified control algorithm can be employed, which leads to reduction in cost.

Figure 2:
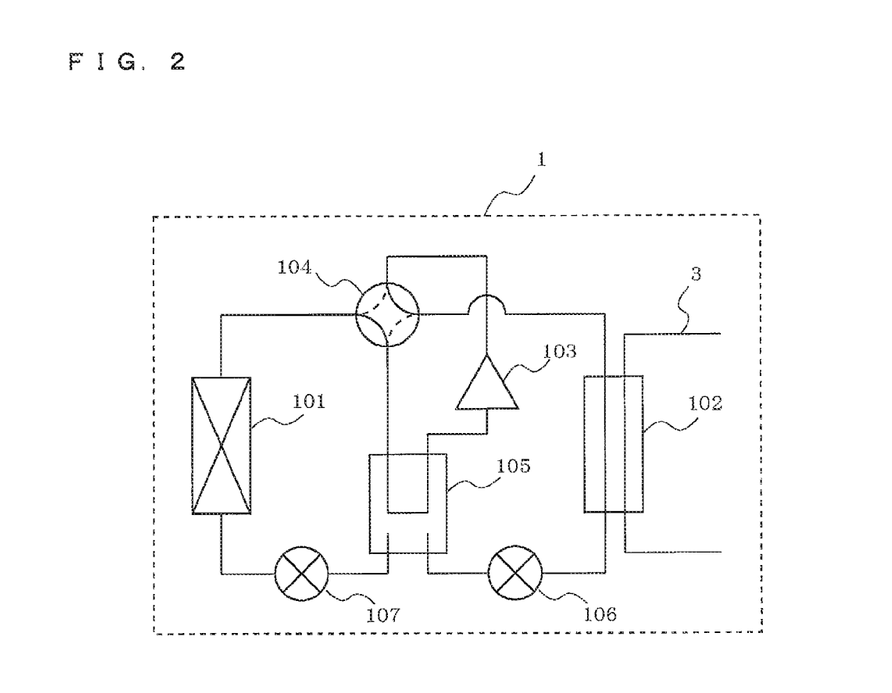
FIG. 2 is a refrigerant circuit diagram showing a general configuration of a heat pump heat source apparatus shown in FIG. 1.

Referring to FIG. 2, the configuration of the heat pump heat source apparatus 1 will be described. FIG. 2 is a refrigerant circuit diagram showing the general configuration of the heat pump heat source apparatus shown in FIG. 1.

The heat pump heat source apparatus 1 includes a compressor 103, a four-way valve 104, a water heat exchanger 102, a first expansion valve 106, a medium pressure receiver 105, a second expansion valve 107, and an air heat exchanger 101, which are sequentially connected via pipes so as to form a refrigerant circuit. The configuration of the refrigerant circuit shown in FIG. 2 is merely an example and not intended to limit the configuration.

The compressor 103 includes an inverter, and adjusts the amount of the refrigerant to be sucked, compressed, and discharged in fine increments, according to the operation frequency controlled by the controller 6. The four-way valve 104 is switched so as to allow the refrigerant from the compressor 103 to flow into the water heat exchanger 102 and to allow the refrigerant from the air heat exchanger 101 to be sucked by the compressor 103, in the hot water heating operation. In addition, the four-way valve 104 is switched so as to allow the refrigerant from the compressor 103 to flow into the air heat exchanger 101 and to allow the refrigerant from the water heat exchanger 102 to be sucked by the compressor 103, in the cold water cooling operation. The switching of the four-way valve 104 is performed by the controller 6.

The water heat exchanger 102 performs heat exchange between the refrigerant flowing through the refrigerant circuit and the water flowing through the pipe 3. The water heat exchanger 102 serves as a radiator (condenser) to heat the water flowing through the pipe 3, in the hot water heating operation. In the cold water cooling operation, the water heat exchanger 102 serves as a heat remover (evaporator) to cool the water flowing through the pipe 3. Although the water heat exchanger 102 is provided inside the heat pump heat source apparatus 1 in Embodiment 1, the water heat exchanger 102 may be independently installed outside the heat pump heat source apparatus 1, or inside the hot and cold water air-conditioning apparatus 2.

The first expansion valve 106 adjusts the flow rate of the refrigerant so as to, for example, control (depressurize) the pressure of the refrigerant flowing through the water heat exchanger 102. The medium pressure receiver 105 is provided between the first expansion valve 106 and the second expansion valve 107 in the refrigerant circuit, and stores surplus refrigerant in the refrigerant circuit. A suction pipe connected between the four-way valve 104 and the suction side of the compressor 103 is passed through the medium pressure receiver 105. Accordingly, the medium pressure receiver 105 can exchange heat between the refrigerant flowing through the suction pipe and the surplus refrigerant, thereby serving as an internal heat exchanger.

The second expansion valve 107 adjusts the flow rate of the refrigerant so as to control the pressure thereof, as does the first expansion valve 106. The expansion valves 106, 107 are each constituted of an electronic expansion valve capable of changing the opening degree according to an instruction from the controller 6. The air heat exchanger 101 is, for example, a fin-and-tube heat exchanger that performs the heat exchange between the refrigerant and ambient air supplied by a fan. The air heat exchanger 101 serves as a heat remover (evaporator) in the hot water heating operation, and as a radiator (condenser) in the cold water cooling operation.

For the refrigerant flowing through the refrigerant circuit of the heat pump heat source apparatus 1, for example R410A or R407C which are HFC-based mixed refrigerant, or R32 which is a HFC-based single refrigerant having a lower global warning potential, may be employed. Alternatively, a hydrofluoroolefin-based refrigerant such as HFO1234yf or HFO1234ze, or a single refrigerant or a mixed refrigerant of HC-based R290 (propane) or R1270 (propylene) may be employed.

The controller 6 controls the on/off operation and the operation frequency of the compressor 103, according to the water temperature detected by the water temperature sensor 5. The controller 6 also controls the operation of the heat pump heat source apparatus 1 on the basis of a target room temperature set by a user through remote control, the room temperature realized by the air conditioning operation of the hot and cold water air-conditioning apparatus 2, and the water temperature detected by the water temperature sensor 5.

Hereunder, description will be given on the circulation of the water in the hot and cold water air conditioning system, in the hot water heating operation and the cold water cooling operation.

In the hot water heating operation, the water is caused to circulate between the heat pump heat source apparatus 1 and the hot and cold water air-conditioning apparatus 2, by the water circulation pump 4 rotating at a constant rotation speed. The circulating water discharged from the water circulation pump 4 flows into the heat pump heat source apparatus 1, and is heated while passing through the water heat exchanger 102 in the heat pump heat source apparatus 1. The hot circulating water which has been heated is supplied to the hot and cold water air-conditioning apparatus 2 to exchange the heat with the air in the room (release the heat), thus to heat the air in the room. The circulating water, now cooled through the heat exchange, is sucked by the water circulation pump 4 and supplied into the heat pump heat source apparatus 1, to be made to again circulate.

In the cold water cooling operation, the circulating water discharged from the water circulation pump 4 is cooled in the water heat exchanger 102 of the heat pump heat source apparatus 1. The cold circulating water which has been cooled is supplied to the hot and cold water air-conditioning apparatus 2 to exchange the heat with the air in the room (remove the heat), thus to cool the air in the room. The circulating water now heated through the heat exchange is sucked by the water circulation pump 4 and supplied into the heat pump heat source apparatus 1, to be made to again circulate.

Figure 3:
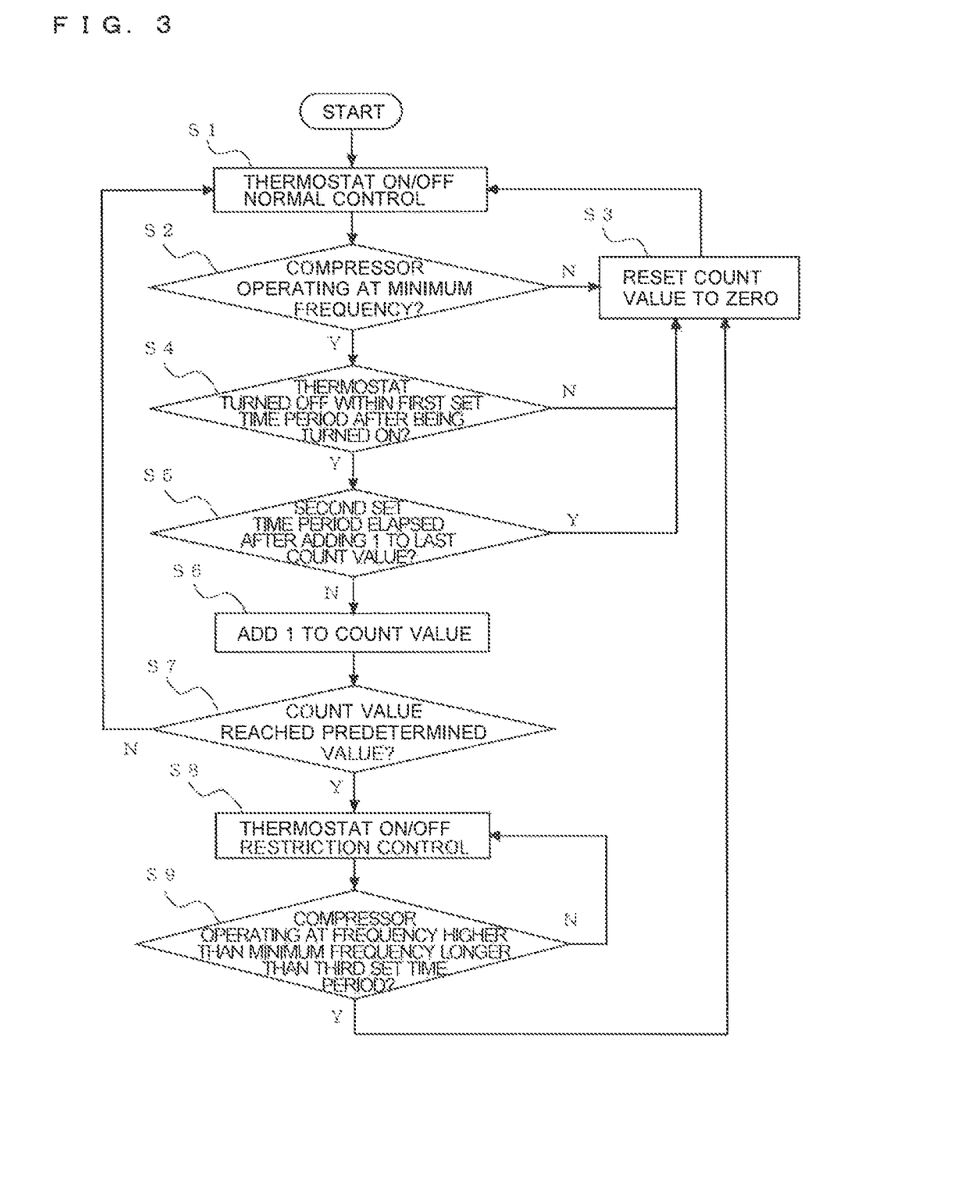
FIG. 3 is a flowchart showing a compressor control process in a hot water heating operation or cold water cooling operation performed by the hot and cold water air conditioning system according to Embodiment 1.

Referring now to FIG. 3, the control of the compressor 103 in the hot and cold water air conditioning system performed in the hot water heating operation will be described. FIG. 3 is a flowchart showing the compressor control process in the hot water heating operation or cold water cooling operation performed by the hot and cold water air conditioning system according to Embodiment 1.

First, the controller 6 drives the four-way valve 104 so as to connect the discharge side of the compressor 103 to the water heat exchanger 102, and the air heat exchanger 101 to the suction side of the compressor 103. Then the controller 6 causes the compressor 103 to discharge the refrigerant so as to make the refrigerant circulate in the refrigerant circuit. The controller 6 also causes the water circulation pump 4 to rotate at a constant rotation speed so as to make the water in the pipe 3 circulate, thus starting the hot water heating operation.

The controller 6 then starts thermostat on/off normal control (corresponding to the on/off normal control in the present invention) of the compressor 103 (step S1). First, the controller 6 reads the water temperature detected by the water temperature sensor 5 and compares the water temperature that has been read with a target water temperature. The target water temperature is, for example, a value determined according to control by the user through remote control.

When the water temperature detected by the water temperature sensor 5 becomes lower than the target water temperature, the controller 6 activates the compressor 103 (thermostat on), and when the water temperature increases to a temperature higher by $\alpha$ degrees C. (e.g., 2 degrees C.) than the target water temperature (corresponding to the first temperature value in the present invention), the controller 6 turns off the compressor 103 (thermostat off). The controller 6 adjusts the operation frequency of the compressor 103 according to the difference between the water temperature and the target water temperature so as to make the water temperature agree with the target water temperature, when the thermostat is on. During the thermostat on/off normal control, it is decided whether the control is to be switched to thermostat on/off restriction control (corresponding to the on/off restriction control in the present invention). The detail of such decision will be described hereunder.

The controller 6 first decides whether the operation frequency of the compressor 103 of the heat pump heat source apparatus 1 is a minimum frequency, for example 25 Hz (step S2). In the case where the operation frequency of the compressor 103 is not the minimum frequency, the controller 6 proceeds to step S3 and resets the count value for deciding whether to switch the operation to the thermostat on/off restriction control to zero, and returns to step S1 to continue the thermostat on/off normal control. In the case where the operation frequency of the compressor 103 is the minimum frequency, the controller 6 proceeds to step S4.

At step S4, the controller 6 decides whether the thermostat has been turned off within a first set time period (e.g., 10 minutes) after the thermostat was turned on, in other words the operation frequency of the compressor 103 was set to the minimum frequency. In the case where the thermostat has not been turned off within the first set time period after the thermostat was turned on, the controller 6 proceeds to step S3 and resets the count value to zero and then returns to step S1 to continue the thermostat on/off normal control. In the case where the thermostat has been turned off within the first set time period after the thermostat was turned on, the controller 6 proceeds to step S5. At this point, the heat amount (heat transfer amount) required by the hot and cold water air-conditioning apparatus 2 is smaller than the operation capacity of the compressor 103 working at the minimum frequency.

At step S5, the controller 6 decides whether a second set time period (e.g., 10 minutes) has elapsed after 1 was last added to the count value. In the case where the second set time period has not yet elapsed, the controller 6 proceeds to step S6, and in the case where the second set time period has elapsed, the controller 6 proceeds to step S3 and resets the count value to zero, and then returns to step S1 to continue the thermostat on/off normal control. Here, in the case where the last count value is zero, in other words the count value for deciding whether the operation should be switched to the thermostat on/off restriction control is zero, the controller 6 skips the decision of step S5 and proceeds to step S6. In addition, although the first set time period and the second set time period are set to 10 minutes in the mentioned process, the set time periods may be set as desired.

At step S6, the controller 6 adds 1 to the count value and decides whether the increased count value has reached a predetermined number (e.g., three) (step S7). In the case where the count value is lower than the predetermined number, the controller 6 again returns to step S1 to continue the thermostat on/off normal control. In contrast, in the case where the increased count value is equal to or higher than the predetermined number, the controller 6 switches the operation to the thermostat on/off restriction control (step S8). Here, although the predetermined number is set to three in the mentioned process, the number may be set to four or more.

Step S2 to step S7 described above are the process of deciding whether the operation of the compressor 103 should be switched from the thermostat on/off normal control to the thermostat on/off restriction control.

In the case where the water temperature detected by the water temperature sensor 5 is below the target water temperature by a large difference in temperature, the controller 6 increases the operation frequency of the compressor 103 thereby increasing the heat supply amount of the compressor 103. When the supply capacity of the heat pump heat source apparatus 1 thus exceeds the heat transfer amount of the hot and cold water air-conditioning apparatus 2, the water temperature detected by the water temperature sensor 5 increases. Then when the water temperature reaches the target water temperature, in order to maintain such a state the controller 6 gradually lowers the operation frequency of the compressor 103 so as to make the supply capacity of the heat pump heat source apparatus 1 and the heat transfer amount of the hot and cold water air-conditioning apparatus 2 generally equal to each other.

In this process, in the case where the water temperature detected by the water temperature sensor 5 keeps rising until the thermostat is turned off (water temperature target water temperature +α degrees C. C) despite the operation frequency of the compressor 103 turns to the minimum frequency (25 Hz), it can be construed that the minimum supply capacity of the heat pump heat source apparatus 1 under the minimum frequency operation of the compressor 103 is larger than the heat transfer amount of the hot and cold water air-conditioning apparatus 2. When the thermostat is turned off and the compressor 103 is turned off, the supply capacity of the heat pump heat source apparatus 1 drops to zero, and therefore the water temperature detected by the water temperature sensor 5 again becomes lower than the target water temperature and the thermostat is turned on (water temperature target water temperature). However, since the minimum supply capacity of the heat pump heat source apparatus 1 is larger than the heat transfer amount of the hot and cold water air-conditioning apparatus 2 even though the thermostat is turned on, once again the thermostat is turned off.

Thus, while the minimum supply capacity of the heat pump heat source apparatus 1 is larger than the heat transfer amount of the hot and cold water air-conditioning apparatus 2, the steps of thermostat on (minimum frequency operation of the compressor 103), thermostat off (compressor 103 turned off), thermostat on (minimum frequency operation of the compressor 103), and thermostat off (compressor 103 turned off) are repeated so as to perform an on/off cycle operation. Therefore, it is decided whether the on/off cycle operation is performed three times or more within the second set time period, through the process from step S2 to step S7.

At step S8, as described above, the thermostat on/off normal control is switched to the thermostat on/off restriction control.

Under the thermostat on/off normal control, the controller 6 activates the compressor 103 of the heat pump heat source apparatus 1 (thermostat on) when the water temperature detected by the water temperature sensor 5 becomes lower than the target water temperature, and turns off the compressor 103 when the water temperature becomes equal to or higher than the target water temperature +α (α=2 degrees C.) (thermostat off).

Under the thermostat on/off restriction control, in contrast, the controller 6 repeats the thermostat on/off operation including activating the compressor 103 of the heat pump heat source apparatus 1 when the water temperature detected by the water temperature sensor 5 becomes lower than a temperature lower by β degrees C. (e.g., 5 degrees C.) than the target water temperature (corresponding to the second temperature value in the present invention), and turning off the compressor 103 when the water temperature becomes equal to or higher than a temperature higher by γ degrees C. (e.g., 5 degrees C.) than the target water temperature (corresponding to the third temperature value in the present invention). Here, although β and γ are set to 5 degrees C. in the mentioned process, those temperatures may be set as desired.

Under the thermostat on/off restriction control, the controller 6 decides whether the water temperature detected by the water temperature sensor 5 is higher than a maximum permissible temperature specified in the hot and cold water air-conditioning apparatus 2. In the case where the water temperature exceeds the maximum permissible temperature, the controller 6 turns off the compressor 103 of the heat pump heat source apparatus 1, to thereby prevent the hot and cold water air-conditioning apparatus 2 from being damaged by the hot water of a high temperature. Here, the maximum permissible temperature is, for example, a value set by the user through remote control according to the maximum permissible temperature of the hot and cold water air-conditioning apparatus 2.

Under the thermostat on/off restriction control, further, it is decided whether the operation should be switched (returned) to the thermostat on/off normal control.

At step 9, the controller 6 decides whether the compressor 103 has been operated at an operation frequency higher than the minimum frequency (25 Hz), in other words at 26 Hz or higher, for a period of time equal to or longer than a third set time period (e.g., 60 minutes). In the case where the compressor 103 is operated at the minimum frequency, the controller 6 returns to step S8 to continue the thermostat on/off restriction control. Although the third set time period is set to 60 minutes in the mentioned process, the third set time period may be set as desired.

In the case where the compressor 103 has been operated at an operation frequency higher than the minimum frequency for a time equal to or longer than the third set time period, it can be construed that the minimum supply capacity of the heat pump heat source apparatus 1 is equal to or lower than the heat transfer amount of the hot and cold water air-conditioning apparatus 2. Therefore, the controller 6 proceeds to step S3 and resets the count value for deciding whether to switch the operation to the thermostat on/off restriction control to zero, and returns to step S1 to resume the thermostat on/off normal control.

In the cold water cooling operation, the four-way valve 104 is switched so as to invert the flow direction of the refrigerant from the hot water heating operation. To be more detailed, the air heat exchanger 101 serves as the radiator (condenser) and the water heat exchanger 102 serves as the heat remover (evaporator) to thereby cool the water flowing through the water heat exchanger 102. Under the thermostat on/off normal control, the thermostat is turned on when the water temperature becomes equal to or higher than the target water temperature, and turned off when the water temperature becomes equal to or lower than a temperature lower by α degrees C. (e.g., 2 degrees C.) than the target water temperature (corresponding to the fourth temperature value in the present invention). The decision whether to switch the operation from the thermostat on/off normal control to the thermostat on/off restriction control is made in the same way as the process from step S2 to step S7 shown in FIG. 3. Under the thermostat on/off restriction control, the thermostat is turned on when the water temperature becomes equal to or higher than a temperature higher by β degrees C. (e.g., 5 degrees C.) than the target water temperature (corresponding to the fifth temperature value in the present invention), and turned off when the water temperature becomes equal to or lower than a temperature lower by γ degrees C. (e.g., 5 degrees C.) than the target water temperature (corresponding to the sixth temperature value in the present invention). In this case, the comparison between the water temperature and the maximum permissible temperature specified in the hot and cold water air-conditioning apparatus 2 is skipped. In addition, the decision whether to switch (return) the operation from the thermostat on/off restriction control to the thermostat on/off normal control is made in the same way as step S9. Here, although α is set to 2 degrees C. and β and γ are set to 5 degrees C. in the mentioned process, those temperatures may be set as desired.

Figure 4:
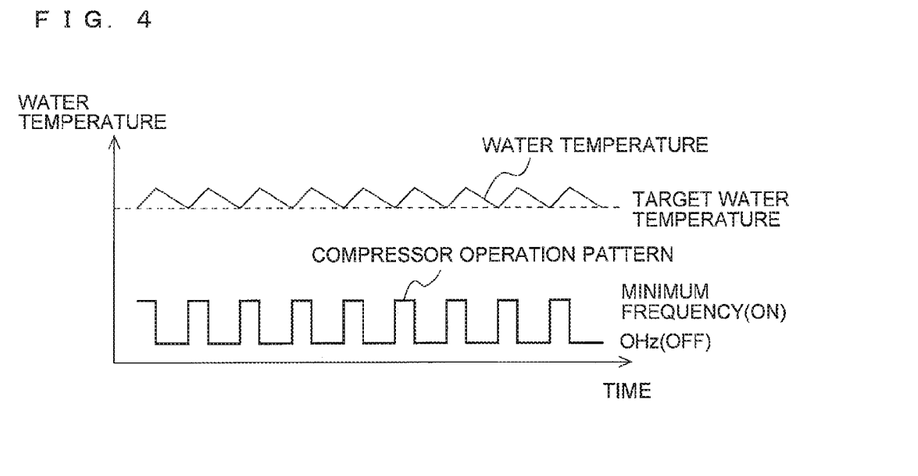
FIG. 4 is a time chart showing an operation pattern of a compressor in a hot water heating operation performed by a conventional hot and cold water air conditioning system.
Figure 5:
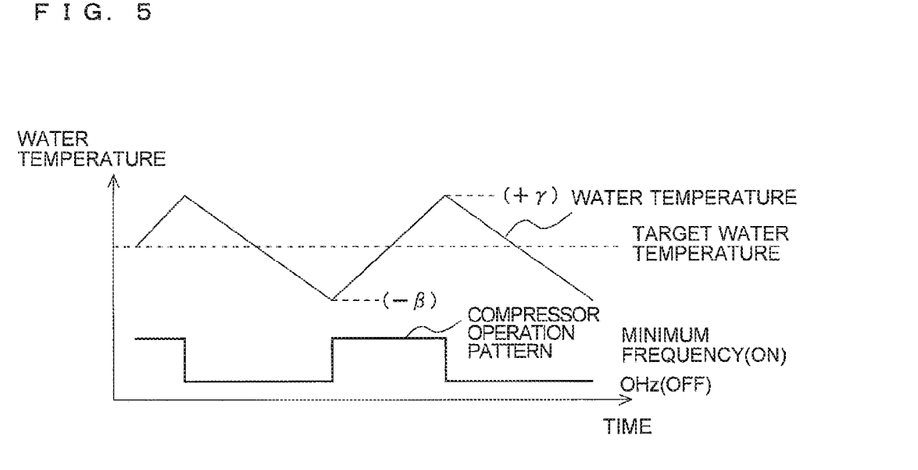
FIG. 5 is a time chart showing an operation pattern of the compressor in the hot water heating operation performed by the hot and cold water air conditioning system according to Embodiment 1.

Referring now to FIG. 4 and FIG. 5, differences in operation pattern between a conventional compressor and the compressor according to Embodiment 1 will be described.

FIG. 4 is a time chart showing an operation pattern of a compressor in a hot water heating operation performed by a conventional hot and cold water air conditioning system, and FIG. 5 is a time chart showing an operation pattern of the compressor in the hot water heating operation performed by the hot and cold water air conditioning system according to Embodiment 1. FIG. 5 illustrates transition of the water temperature and the operation pattern of the compressor 103 in the thermostat on/off restriction control.

As shown in FIG. 4, the conventional compressor is operated only under the thermostat on/off normal control. Because of quick response of the water temperature detection by the water temperature sensor 5, the water temperature is detected to be higher than the target water temperature and hence the thermostat is turned off (the compressor of the heat pump heat source apparatus is turned off), shortly after the thermostat is turned on. Shortly thereafter, the water temperature is detected to be lower than the target water temperature, because although the compressor is off the water circulation pump 4 is working to circulate the water, and the thermostat is turned on. Thus, the compressor performs the thermostat on/off cycle operation, and hence the heat pump heat source apparatus performs the on/off operation.

According to Embodiment 1, in contrast, the repetition of the on/off cycle operation is detected and the thermostat on/off normal control is switched to the thermostat on/off restriction control. Under the thermostat on/off restriction control, it takes a longer time before the thermostat is turned on when the thermostat is off, as well as before the thermostat is turned off when the thermostat is on, as shown in FIG. 5. Therefore the number of times of the repetition of the thermostat on/off operation is reduced.

According to Embodiment 1, as described thus far, when the compressor 103 is operated at the minimum possible frequency under the on/off normal control, the operation is switched to the on/off restriction control in which the compressor 103 is turned on when the water temperature becomes lower than the temperature lower by β degrees C. than the target water temperature (or equal to or higher than the temperature higher by β degrees C. than the target water temperature), and turned off when the water temperature becomes equal to or higher than the temperature higher by γ degrees C. than the target water temperature (or lower than the temperature lower by γ degrees C. than the target water temperature). Therefore, even though the minimum supply capacity of the heat pump heat source apparatus 1 realized through the control of the operation frequency of the compressor 103 is larger than the heat transfer amount (in the hot water heating operation) or the heat removal amount (in the cold water cooling operation) required by the hot and cold water air-conditioning apparatus 2, the repetition of the on/off cycle operation of the compressor 103 can be suppressed, and consequently a high-efficiency and long-life hot and cold water air conditioning system can be obtained.

Embodiment 2

Figure 6:
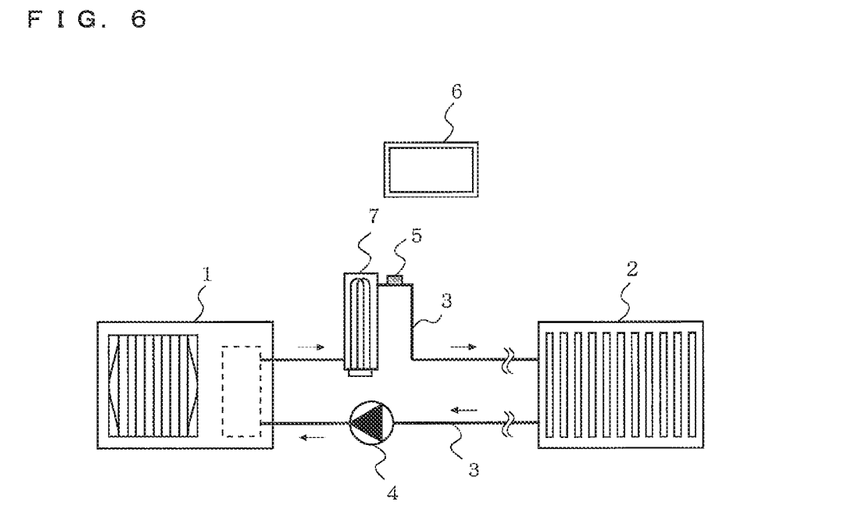
FIG. 6 is a block diagram showing a general configuration of a hot and cold water air conditioning system according to Embodiment 2.

FIG. 6 is a block diagram showing a general configuration of a hot and cold water air conditioning system according to Embodiment 2.

The hot and cold water air conditioning system according to Embodiment 2 further includes an auxiliary heater 7 for heating the circulating water, provided between the heat pump heat source apparatus 1 and the water temperature sensor 5. In case that the supply capacity of the heat pump heat source apparatus 1 becomes insufficient in the hot water heating operation, the auxiliary heater 7 is employed as an auxiliary heat source for heating the circulating water. The power supply to the auxiliary heater 7 is performed by the controller 6.

In Embodiment 2, the compressor 103 is operated in the same way as the flowchart shown in FIG. 3, both in the hot water heating operation and in the cold water cooling operation. More specifically, the controller 6 switches the operation, upon detecting that the minimum supply capacity of the heat pump heat source apparatus 1 is larger than the heat transfer amount (in the hot water heating operation) or the heat removal amount (in the cold water cooling operation) required by the hot and cold water air-conditioning apparatus 2, from the thermostat on/off normal control to the thermostat on/off restriction control. In addition, the controller 6 switches the operation, upon detecting that the minimum supply capacity of the heat pump heat source apparatus 1 is smaller than the heat transfer amount or the heat removal amount required by the hot and cold water air-conditioning apparatus 2, from the thermostat on/off restriction control to the thermostat on/off normal control.

Therefore, even though the minimum supply capacity of the heat pump heat source apparatus 1 realized through the control of the operation frequency of the compressor 103 is larger than the heat transfer amount (in the hot water heating operation) or the heat removal amount (in the cold water cooling operation) required by the hot and cold water air-conditioning apparatus 2, the repetition of the on/off cycle operation of the compressor 103 can be suppressed. Further, since the auxiliary heater 7 for heating the circulating water is provide between the heat pump heat source apparatus 1 and the water temperature sensor 5, the temperature of the hot water can be more quickly raised to the target temperature, in the hot water heating operation.

Embodiment 3

Figure 7:
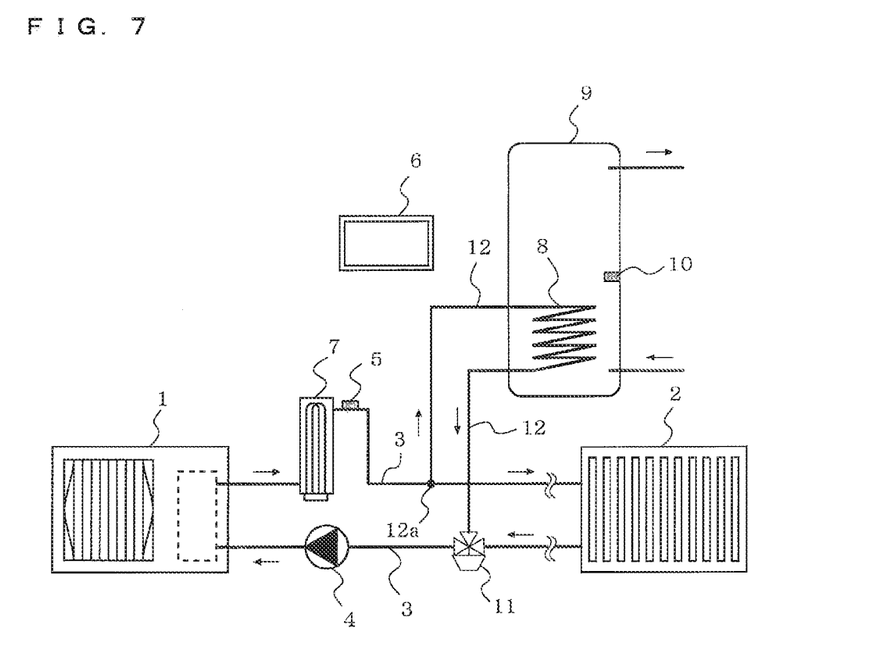
FIG. 7 is a block diagram showing a general configuration of a hot and cold water air conditioning system according to Embodiment 3.

FIG. 7 is a block diagram showing a general configuration of a hot and cold water air conditioning system according to Embodiment 3.

The hot and cold water air conditioning system according to Embodiment 3 further includes a hot water tank 9 with a built-in heat exchanger 8. An end portion of the heat exchanger 8 is connected via a pipe 12 to a branch pipe 12a (branch point) inserted to a pipe 3 provided between the auxiliary heater 7 and the hot and cold water air-conditioning apparatus 2, and the other end portion of the heat exchanger 8 is connected via a pipe 12 to an electric three-way valve 11 (junction point) inserted in the pipe 3 provided between the water circulation pump 4 and the hot and cold water air-conditioning apparatus 2. The hot water tank 9 is provided with a tank water temperature sensor 10 that detects the temperature of the water heated by the heat exchanger 8.

The controller 6 according to Embodiment 3 selects one of the hot water heating operation, the cold water cooling operation, or the hot water supply operation, for example according to the remote control operation by the user. The controller 6 drives, as described earlier, the electric three-way valve 11 so as to cause the hot water or cold water to circulate between the heat pump heat source apparatus 1 and the hot and cold water air-conditioning apparatus 2, in the hot water heating operation or the cold water cooling operation, respectively. In addition, the controller 6 drives the electric three-way valve 11 so as to cause the hot water to circulate between the heat pump heat source apparatus 1 and the heat exchanger 8, in the hot water supply operation.

In Embodiment 3, the compressor 103 is operated in the same way as in Embodiment 1 (see FIG. 3), both in the hot water heating operation and in the cold water cooling operation. The controller 6 switches the operation, upon detecting that the minimum supply capacity of the heat pump heat source apparatus 1 is larger than the heat transfer amount (in the hot water heating operation) or the heat removal amount (in the cold water cooling operation) required by the hot and cold water air-conditioning apparatus 2, from the thermostat on/off normal control to the thermostat on/off restriction control. In addition, the controller 6 switches the operation, upon detecting that the minimum supply capacity of the heat pump heat source apparatus 1 is smaller than the heat transfer amount or the heat removal amount required by the hot and cold water air-conditioning apparatus 2, from the thermostat on/off restriction control to the thermostat on/off normal control.

Therefore, even though the minimum supply capacity of the heat pump heat source apparatus 1 realized through the control of the operation frequency of the compressor 103 is larger than the heat transfer amount (in the hot water heating operation) or the heat removal amount (in the cold water cooling operation) required by the hot and cold water air-conditioning apparatus 2, the repetition of the on/off cycle operation of the compressor 103 can be suppressed.

In Embodiment 3, the compressor 103 is controlled in the same way as in Embodiment 1 (see FIG. 3), also in the hot water supply operation. In this case, the controller 6 switches the operation, upon detecting that the minimum supply capacity of the heat pump heat source apparatus 1 is larger than the heat transfer amount required by the heat exchanger 8, from the thermostat on/off normal control to the thermostat on/off restriction control. In addition, the controller 6 switches the operation, upon detecting that the minimum supply capacity of the heat pump heat source apparatus 1 is smaller than the heat transfer amount required by the heat exchanger 8, from the thermostat on/off restriction control to the thermostat on/off normal control.

Thus, in the hot water supply operation also, the repetition of the on/off cycle operation of the compressor 103 can be suppressed, even when the minimum supply capacity of the heat pump heat source apparatus 1 realized through the control of the operation frequency of the compressor 103 is larger than the heat transfer amount required by the heat exchanger 8.

REFERENCE SIGNS LIST

1: heat pump heat source apparatus, 2: hot and cold water air-conditioning apparatus, 3: pipe, 4: water circulation pump, 5: water temperature sensor, 6: controller, 7: auxiliary heater, 8: heat exchanger, 9: hot water tank, 10: tank water temperature sensor, 11: electric three-way valve, 12: pipe, 12a: branch pipe, 101: air heat exchanger, 102: water heat exchanger, 103: compressor, 104: four-way valve, 105: medium pressure receiver, 106: first expansion valve, 107: second expansion valve

The invention claimed is:

1. A hot and cold water air conditioning system that includes a heat pump heat source apparatus including a compressor driven according to an operation frequency, an air-conditioning apparatus configured to perform air conditioning in a room, pipes connecting the heat pump heat source apparatus and the air-conditioning apparatus in a ring shape thereby forming a circulation path, and a water circulation pump configured to circulate water inside the pipes, the system comprising:

a water temperature sensor configured to detect a temperature of water flowing out of the heat pump heat source apparatus by an operation of the water circulation pump; and a controller configured to perform, in a heating operation, on/off normal control for the heating operation that turns on the compressor when the water temperature detected by the water temperature sensor becomes lower than a target water temperature and turns off the compressor when the water temperature becomes higher than a first temperature value higher than the target water temperature, wherein the controller is configured to switch from the on/off normal control for the heating operation, upon repeating an on/off operation of the compressor during an operation of the compressor at a minimum frequency required for the operation of the compressor in the on/off normal control for the heating operation, to on/off restriction control for the heating operation that turns on the compressor when the water temperature becomes lower than a second temperature value lower than the target water temperature and turns off the compressor when the water temperature becomes equal to or higher than a third temperature value higher than the target water temperature.

2. The hot and cold water air conditioning system of claim 1,
wherein the controller is configured to
perform, in a cooling operation, the on/off normal control for the cooling operation that turns on the compressor when the water temperature detected by the water temperature sensor becomes equal to or higher than the target water temperature and turns off the compressor when the water temperature becomes lower than a fourth temperature value lower than the target water temperature, and
perform, upon repeating the on/off operation of the compressor during the operation of the compressor at a minimum frequency required for the operation of the compressor in the on/off normal control for the cooling operation, the on/off restriction control for the cooling operation that turns on the compressor when the water temperature becomes equal to or higher than a fifth temperature value higher than the target water temperature and turns off the compressor when the water temperature becomes lower than a sixth temperature value lower than the target water temperature.

3. The hot and cold water air conditioning system of claim 1,
wherein the controller is configured to count as one time when the on/off operation of the compressor is performed in the minimum frequency within a first set time period, and switch from the on/off normal control to the on/off restriction control when a number of times counted reaches a predetermined value within a second set time period equal to or longer than the first set time period.

4. The hot and cold water air conditioning system of claim 2,
wherein the controller is configured to count as one time when the on/off operation of the compressor is performed in the minimum frequency for the cooling operation or the heating operation within a first set time period, and switch from the on/off normal control to the on/off restriction control when a number of times counted reaches a predetermined value within a second set time period equal to or longer than the first set time period.

5. The hot and cold water air conditioning system of claim 3,
wherein the controller is configured to reset the number of times counted when the operation frequency of the compressor is not the minimum frequency upon turning on the compressor, when the on/off operation of the compressor at the minimum frequency is performed longer than the first set time period, and when the second set time period elapses before the number of times counted reaches the predetermined value.

6. The hot and cold water air conditioning system of claim 4,
wherein the controller is configured to reset the number of times counted when the operation frequency of the compressor is not the minimum frequency for the cooling operation or the heating operation upon turning on the compressor, when the on/off operation of the compressor at the minimum frequency is performed longer than the first set time period, and when the second set time period elapses before the number of times counted reaches the predetermined value.

7. The hot and cold water air conditioning system of claim 1,
wherein the controller is configured to return from the on/off restriction control to the on/off normal control, in a case where the compressor is continuously operated at a frequency higher than the minimum frequency for a period of time longer than a third set time period, during the on/off restriction control.

8. The hot and cold water air conditioning system of claim 2,
wherein the controller is configured to return from the on/off restriction control to the on/off normal control, in a case where the compressor is continuously operated at a frequency higher than the minimum frequency for the cooling operation or the heating operation for a period of time longer than a third set time period, during the on/off restriction control.

9. The hot and cold water air conditioning system of claim 3,
wherein the controller is configured to return from the on/off restriction control to the on/off normal control, in a case where the compressor is continuously operated at a frequency higher than the minimum frequency for a period of time longer than a third set time period, during the on/off restriction control.

10. The hot and cold water air conditioning system of claim 4,
wherein the controller is configured to return from the on/off restriction control to the on/off normal control, in a case where the compressor is continuously operated at a frequency higher than the minimum frequency for the cooling operation or the heating operation for a period of time longer than a third set time period, during the on/off restriction control.

11. The hot and cold water air conditioning system of claim 5,
wherein the controller is configured to return from the on/off restriction control to the on/off normal control, in a case where the compressor is continuously operated at a frequency higher than the minimum frequency for a period of time longer than a third set time period, during the on/off restriction control.

12. The hot and cold water air conditioning system of claim 6,
wherein the controller is configured to return from the on/off restriction control to the on/off normal control, in a case where the compressor is continuously operated at a frequency higher than the minimum frequency for the cooling operation or the heating operation for a period of time longer than a third set time period, during the on/off restriction control.

13. The hot and cold water air conditioning system of claim 1, further comprising an auxiliary heater provided between the heat pump heat source apparatus and the water temperature sensor.

14. The hot and cold water air conditioning system of claim 1, further comprising:
- a hot water tank including a heat exchanger provided between a branch point provided between the water temperature sensor and the air-conditioning apparatus and a junction point provided between the air-conditioning apparatus and the water circulation pump, the heat exchanger being connected via a pipe so as to be arranged in parallel with the air-conditioning apparatus, and
- a three-way valve provided at one of the branch point and the junction point, and configured to switch a flow of water circulated by the water circulation pump, toward one of the air-conditioning apparatus and the hot water tank.

* * * * *